(12) United States Patent
Rupp

(10) Patent No.: US 11,981,493 B2
(45) Date of Patent: May 14, 2024

(54) PACKAGING MATERIAL WITH A FIXED DESICCANT CONTAINER, AND METHOD

(71) Applicant: Robert Bosch GmbH, Stuttgart (DE)

(72) Inventor: Jochen Rupp, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 973 days.

(21) Appl. No.: 17/254,955

(22) PCT Filed: Aug. 2, 2018

(86) PCT No.: PCT/EP2018/070979
§ 371 (c)(1),
(2) Date: Dec. 22, 2020

(87) PCT Pub. No.: WO2019/030108
PCT Pub. Date: Feb. 14, 2019

(65) Prior Publication Data
US 2021/0179336 A1 Jun. 17, 2021

(30) Foreign Application Priority Data
Aug. 10, 2017 (DE) ............... 10 2017 213 943.9

(51) Int. Cl.
| | | |
|---|---|---|
| *B65D 81/26* | (2006.01) | |
| *B29C 65/20* | (2006.01) | |
| *B65B 61/22* | (2006.01) | |
| *B29L 31/00* | (2006.01) | |

(52) U.S. Cl.
CPC ............ *B65D 81/268* (2013.01); *B29C 65/20* (2013.01); *B65B 61/22* (2013.01); *B29L 2031/712* (2013.01)

(58) Field of Classification Search
CPC . B01L 2300/105; B65B 55/19; B65D 81/268; B65D 81/266; B65D 81/267; B65D 81/264; B65D 75/26
USPC .............................. 206/204, 205; 383/38, 40
See application file for complete search history.

(56) References Cited

U.S. PATENT DOCUMENTS

| | | | | |
|---|---|---|---|---|
| 4,813,791 | A * | 3/1989 | Cullen .................. | B65D 77/06 206/204 |
| 5,372,429 | A * | 12/1994 | Beaver, Jr. ............ | B65D 81/03 206/524.4 |
| 5,962,333 | A | 10/1999 | Incorvia et al. | |
| 2009/0266729 | A1* | 10/2009 | Alcouloumre ..... | B65D 83/0888 206/370 |

(Continued)

FOREIGN PATENT DOCUMENTS

| | | |
|---|---|---|
| DE | 197 20 112 A1 | 12/1998 |
| DE | 20 2011 000 845 U1 | 8/2011 |
| EP | 0 481 730 A2 | 4/1992 |

(Continued)

OTHER PUBLICATIONS

International Search Report corresponding to PCT Application No. PCT/EP2018/070979, dated Nov. 20, 2018 (German and English language document) (6 pages).

*Primary Examiner* — King M Chu
(74) *Attorney, Agent, or Firm* — Maginot, Moore & Beck LLP

(57) ABSTRACT

A packaging material for packaging a device, particularly a microfluidic device, includes a desiccant container, particularly a desiccant pouch. The desiccant container is fixed in place by melting patches of a material of the packaging material.

12 Claims, 1 Drawing Sheet

(56) References Cited

U.S. PATENT DOCUMENTS

2013/0153445 A1* 6/2013 Cullison ................ B65B 61/20
53/473

FOREIGN PATENT DOCUMENTS

| FR | 2 660 634 A1 | 10/1991 |
|---|---|---|
| JP | 2005-350099 A | 12/2005 |
| WO | 97/32663 A1 | 9/1997 |

* cited by examiner

PACKAGING MATERIAL WITH A FIXED DESICCANT CONTAINER, AND METHOD

This application is a 35 U.S.C. § 371 National Stage Application of PCT/EP2018/070979, filed on Aug. 2, 2018, which claims the benefit of priority to Serial No. DE 10 2017 213 943.9, filed on Aug. 10, 2017 in Germany, the disclosures of which are incorporated herein by reference in their entirety.

BACKGROUND

Prior Art

Systems for processing or analyzing a chemical or biological sample, for example microfluidic or lab-on-a-chip systems, often comprise moisture-sensitive devices or components, for example microfluidic cartridges, in which lyophilized reagents are pre-stored. For storage with long-term stability, these devices or components thereof are therefore stored prior to use, often in sealed or welded composite packaging.

SUMMARY

Advantages of the Invention

Against this background, the disclosure relates to a packaging material for packaging a device, in particular a microfluidic device. The packaging material comprises a desiccant container, in particular a desiccant pouch, wherein the desiccant container is fixed by way of melting the packaging material, in particular a material of the packaging material, at isolated points.

A device can be understood in particular to be a component, an apparatus or a part of a system for processing or analyzing a chemical or biological sample, for example for biochemical or medical purposes. A packaging material can be understood in particular to be a packaging or a part of a packaging, in particular a sleeve for the partial or complete encapsulation of the device. A packaging material can also be understood in particular to be a film with one or more layers, in particular a composite film, which can be designed for example in the form of a pouch or a bag. A desiccant container can be understood in particular to be a container for receiving a desiccant. The desiccant container can have a stiff or deformable sleeve. The desiccant container is preferably a desiccant pouch, that is to say a pouch for receiving desiccant. The desiccant container preferably already contains the desiccant prior to being fixed to the packaging material. A desiccant is to be understood in particular as a substance or a substance mixture which can extract water or other liquids, for example solvents, from a proximate object for the purpose of drying or keeping dry. Typical desiccants are for example silica gel, zeolites, sodium sulfate, magnesium sulfate, aluminum oxide, calcium, calcium hydride, calcium oxide, calcium sulfate, potassium carbonate, potassium hydroxide, copper sulfate, lithium aluminum hydride, or sodium hydroxide. Melting of the packaging material is to be understood in particular to be the softening and/or deformation of the packaging material, in particular under the effect of heat, in particular followed by resolidification through cooling. In the process, a material of the packaging material and/or a material of the desiccant container can be melted at isolated points for the fixing of the desiccant container, in particular a material of a sleeve of the packaging material or of the desiccant container, respectively. Fixing of the desiccant container to the material by way of melting at isolated points is to be understood in particular as meaning that a fixed connection is produced between the material and the desiccant container by way of a partial softening of the material, in particular brought about by heat, followed by contact connection of the softened material with the desiccant container, followed by a renewed hardening, in particular by cooling, of the material. Expressed differently, the material is fused to the desiccant container by way of softening of the material. As an alternative or in addition, a partial softening of the material of the desiccant container, in particular brought about by heat, may also take place for fusing to the packaging material.

The packaging material according to the disclosure has the advantage that, by virtue of being fused to the packaging material at a well-defined location, the desiccant container is fixedly arranged with respect to the packaging material and with respect to the device to be packaged by means of the packaging material. Consequently, the desiccant container can advantageously be immovably and stably positioned close to desired, in particular moisture-sensitive, locations of the device to be packaged. In addition, slipping of the desiccant container in the case of movement of the packaged device advantageously does not take place, with the result that the risk of damage to sensitive regions of the device by the desiccant container, for example in the form of scratch marks, is reduced. It is also of particular advantage that a material of the packaging material acts as connecting means between the packaging material and the desiccant container. An additional substance, in particular an adhesive, is consequently not necessary for the connection, thereby ruling out a possible detrimental effect of the substance on the device. In particular, an outgassing, which is otherwise usual in the case of many adhesives, or an unintended transfer of adhesive residues to the device is avoided. It is furthermore of advantage that, when the packaging is being opened, the desiccant container generally remains fixed and is not unintentionally separated from the packaging. This leads to a high degree of user friendliness of the packaging material according to the disclosure.

The desiccant container is preferably fixed via penetration of a material of the packaging material at isolated points into a sleeve of the desiccant container. This advantageously produces a particularly reliable connection of the desiccant container to the packaging material. The sleeve of the desiccant container is configured here such that the molten material of the packaging material can penetrate at least partially into the sleeve. In particular, the sleeve can comprise fibers or a fibrous material so that the penetration leads to the material, for example paper, cotton wool or another fibrous material, for example in combination with plastic, at least partially enclosing a plurality of fibers. A form fit created in this way between the material and the sleeve of the desiccant container is advantageously particularly stable.

The disclosure also relates to a method for connecting the desiccant container to the packaging material, i.e. a method according to the disclosure for producing the packaging material according to the disclosure. The desiccant container can thus be in particular a desiccant pouch, as stated above, and the device can be in particular a microfluidic device. In a first step of the method, the packaging material and the desiccant container are positioned relative to one another. In a second step, at least one region of the packaging material is heated, with the result that the packaging material melts at isolated points in the region for the connection of the desiccant container to the packaging material. As described above, part of the material preferably penetrates into the sleeve of the desiccant container here, preferably for partially enclosing fibers of the sleeve. While the material cools, the connection of the desiccant container to the packaging material preferably hardens.

In one particularly advantageous configuration of the disclosure, the packaging material comprises composite material, in particular an aluminum/polypropylene composite. This has the advantage, on the one hand, that composite materials constitute packaging materials which are well-suited according to the disclosure, and, on the other hand, melt easily under the effect of heat. In this case, the meltable material preferably comprises plastic.

In one advantageous configuration of the disclosure, the region is heated until at least a part of the sleeve of the desiccant container likewise softens or melts. This has the advantage that the part of the sleeve and the molten material can mix with one another for a particularly strong connection. The sleeve of the desiccant container preferably has a meltable material, in particular plastic, for this purpose.

According to one particularly advantageous refinement of the disclosure, the desiccant container is arranged at a predefined location with respect to the device prior to the heating. This has the advantage that it can be easily ensured that the desiccant container is located close or directly adjacent to a desired, in particular moisture-sensitive, location of the device after the device has been packaged. Sealing of the packaging material for the purpose of closing the device can take place here prior to, during or after the heating.

In one particularly preferred refinement of the disclosure, a force is exerted on the packaging material in the direction of the desiccant container during or after the heating. This advantageously assists a connection of the packaging material to the desiccant container.

The region is heated preferably by way of a contact connection with a heating die. This has the advantage that the required heat is introduced in a well-defined and delimited manner, and thus heat-sensitive parts of the packaging material or of the device can easily remain unaffected.

In one advantageous refinement of the disclosure, the packaging material has an embossed contour on a side of the melting that faces away from the desiccant container. The contour can preferably code an item of information which is useful for a user of the device. In one particularly advantageous configuration of the method according to the disclosure, the contour is embossed by way of the heating die. The heating die comprises the required embossed structure for this purpose. This has the advantage that both the desiccant container can be connected to the packaging material and the contour can be created in only one step.

According to one preferred refinement of the disclosure, an opening of the packaging material is sealed, after the device is introduced into the packaging material, jointly with the heating of the region. In this refinement, the packaging material preferably has the form of a pouch for receiving the device. In particular when the sealing takes place likewise by way of partial melting of the material of the composite pouch, this refinement has the advantage that two method steps can be carried out in one. By way of example, in this respect the heating die comprises a second region for heat-sealing the opening of the packaging material.

BRIEF DESCRIPTION OF THE DRAWINGS

Exemplary embodiments of the disclosure are schematically illustrated in the drawings and explained in more detail in the description hereinbelow. The same reference signs are used for the similarly acting elements illustrated in the various figures, a repeated description of the elements being dispensed with.

In the drawings.

DETAILED DESCRIPTION

Figure 1:
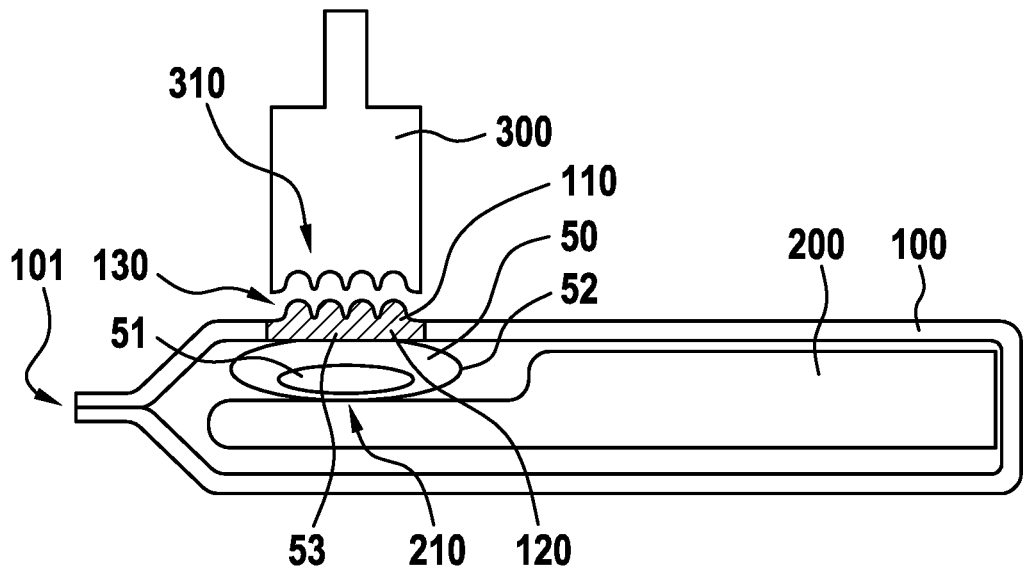
FIG. 1 shows an exemplary embodiment of the packaging material according to the disclosure.

FIG. 1 schematically shows one exemplary embodiment of the packaging material 100 according to the disclosure for packaging a device 200. In this example, the device 200 is a microfluidic device, specifically a cartridge 200 for a lab-on-a-chip system. The packaging material 100 comprises a desiccant container 50, in this example a desiccant pouch 50 filled with desiccant 51, for example silica gel. The desiccant container 50 is fixedly connected to the packaging material 100 by way of melting 110 of a material 120 of the packaging material 100 at isolated points.

In this example, the packaging material 100 is a pouch 100 of composite material, for example a pouch produced from a composite film with the layer sequence of polyethylene, aluminum, polypropylene. Illustrated in FIG. 1 is that the cartridge 200 is already located in the composite pouch 100 and the opening 101 of the composite pouch 100 is already sealed. The desiccant pouch 50 is also already connected to the pouch 100 by way of the melting 110. In this example, the desiccant pouch 50 comprises a fibrous material, so that it was possible for the molten material 120 to penetrate partially into the sleeve 52 of the desiccant pouch 50 and enclose fibers of the sleeve 52 for a form-fitting connection of the desiccant pouch 50 to the composite pouch 100. By way of example, the desiccant pouch 50 comprises a fibrous substance, cotton wool, a nonwoven material or paper for this purpose. As an alternative or in addition, the sleeve 52 can comprise a meltable material 53 for fusing to the material 120 of the composite pouch 100. As is also schematically illustrated in FIG. 1, the heat required for the melting has been introduced by way of a heating die 300 having an embossed structure 310, and at the same time a contour 130 has been embossed onto the outer side of the composite pouch 100. The contour 130 can code information about the cartridge 200 that is useful for a user of the device 100 and can do so in the form of text or symbols, for example an indication relating to the origin, type and/or usability of the cartridge 200.

Figure 2:
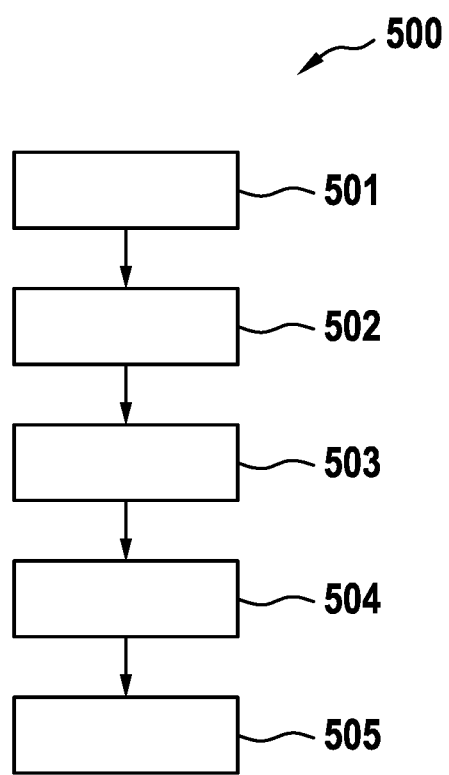
FIG. 2 shows a flow chart of an exemplary embodiment of the method according to the disclosure.

FIG. 2 schematically shows a flow chart of an exemplary embodiment of the method 500 according to the disclosure, by means of which for example the packaging, illustrated in FIG. 1, of the cartridge 200 can be achieved by the packaging material 100 and connected desiccant container 50. In a first step 501 of the method 500, the desiccant pouch 100 is placed onto a predefined location 210 of the cartridge 200, for example close to the particularly moisture-sensitive front portion 210 of the cartridge. In a second step 502, the cartridge 200 and the desiccant pouch 100 are provided in the composite pouch 100. The first step 501 and the second step 502 can also take place in parallel or in a reverse order. In a third step 503, the opening 101 of the composite pouch 100 is sealed. In a fourth step, the material 110 of the composite pouch 100 that adjoins the desiccant pouch 50 is heated, with the result that the material 110 melts and thus penetrates partially into the sleeve 52 of the desiccant pouch 50 for a form fit with the fibers of the sleeve 52. In this case, the heating takes place by way of a contact connection of the embossed structure 310 of the heating die 300 with the material, with the result that also at the same time the contour 130 is embossed into the composite pouch 100. If a contour 130 is not required, a heating die with a flat die surface can also be used. By way of example, the die is heated to a temperature between 190 and 250 degrees Celsius and for a heat effect duration on the material 110 of 1 to 5 seconds. The duration depends here on the thickness and the material composition of the composite material, such that the material 110 is softened up to that side of the composite pouch 100 which makes contact with the desiccant pouch 50. In this case, the heating die 300 can exert for example a contact pressure of between 1 and 15 newtons. The third step 503 of sealing the composite pouch 100 and the fourth step 504 of heating and embossing can preferably also be carried out at the same time here, in particular when the sealing likewise takes place by way of a partial melting of the material of the composite pouch 100. In a fifth step 505, the composite pouch 100 can be conveyed further after cooling.

The invention claimed is:

1. A packaging material system for packaging a device comprising:
   a packaging material; and
   a desiccant container fixed to the packaging material,
   wherein the packaging material is melted at isolated points to fix the desiccant container to the packaging material, and
   wherein the packaging material has an embossed contour on a side of the isolated points that faces away from the desiccant container, the embossed contour including coded information about the packaging material system.

2. The packaging material system as claimed in claim 1, wherein:
   the desiccant container includes a sleeve that encloses a desiccant, and
   the desiccant container is fixed to the packaging material at the isolated points via melting of the sleeve in such a way that the packaging material penetrates partially into the sleeve in a melted region of the sleeve so as to fix the desiccant container to the packaging material at the isolated points.

3. The packaging material system as claimed in claim 1, wherein the packaging material comprises composite material.

4. The packaging material system as claimed in claim 2, wherein the sleeve of the desiccant container comprises fibers or a fibrous material.

5. The packaging material system as claimed in claim 1, wherein the desiccant container includes a sleeve comprising a meltable material fused to the packaging material so as to fix the desiccant container to the packaging material.

6. The packaging material system as claimed in claim 4, wherein the fibrous material includes paper or cotton wool.

7. The packaging material system as claimed in claim 1, wherein the coded information includes text or symbols indicative of at least one of an origin, a type, and a usability of a cartridge packaged in the packaging material system.

8. A method for producing the packaging material system of claim 1, comprising:
   positioning the packaging material and the desiccant container in relation to one another; and
   heating at least one region of the packaging material to melt the packaging material at the isolated points to connect the desiccant container to the packaging material, the heating further producing the embossed contour on the side of the isolated points that faces away from the desiccant container.

9. The method as claimed in claim 8, wherein the positioning comprises:
   arranging the desiccant container at a predefined location with respect to the device prior to the heating.

10. The method as claimed in claim 9, further comprising:
    exerting a force on the packaging material in a direction of the desiccant container during or after the heating.

11. The method as claimed in claim 10, wherein the heating comprises:
    heating the at least one region using a contact connection with a heating die.

12. The method as claimed in claim 11, further comprising:
    sealing an opening of the packaging material jointly with the heating of the at least one region.

* * * * *